United States Patent
Zhang et al.

(10) Patent No.: US 11,195,431 B1
(45) Date of Patent: Dec. 7, 2021

(54) DEFINING PERSONALIZED WRITING BURST MEASURES OF TRANSLATION USING KEYSTROKE LOGS

(71) Applicant: Educational Testing Service, Princeton, NJ (US)

(72) Inventors: Mo Zhang, West Windsor, NJ (US); Jiangang Hao, Princeton, NJ (US); Paul Deane, Lawrenceville, NJ (US); Chen Li, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 338 days.

(21) Appl. No.: 16/299,256

(22) Filed: Mar. 12, 2019

Related U.S. Application Data (60) Provisional application No. 62/641,704, filed on Mar. 12, 2018.

(51) Int. Cl.
 *G09B 19/00* (2006.01)
 *G09B 7/02* (2006.01)

(52) U.S. Cl.
 CPC ............. *G09B 19/00* (2013.01); *G09B 7/02* (2013.01)

(58) Field of Classification Search
 None
 See application file for complete search history.

(56) References Cited

U.S. PATENT DOCUMENTS

2016/0133147 A1* 5/2016 Deane .................. G09B 7/02
 434/353

OTHER PUBLICATIONS

American Educational Research Association, American Psychological Association & National Council on measurement in Education (AERA, APA & NCME], 1999, Standards for Educational & Psychological Testing, Washington, DC, American Educational Res. Assoc.

Alves, Rui Alexandre, Castro, Sao Luis, de Sousa, Liliana, Stromqvist, Sven; Influence of Typing Skill on Pause-Execution Cycles in Written Composition; Ch. 4 in Writing and Cognition: Research and Applications; Elsevier Amsterdam; pp. 55-65; 2007.

(Continued)

*Primary Examiner* — James B Hull
(74) *Attorney, Agent, or Firm* — Jones Day

(57) ABSTRACT

Systems and methods for defining and using an optimal burst boundary threshold to assess the reliability of a manual/automatic writing score are presented. Keystroke data, including inter-key interval data, such as inter-word interval data, may be gathered from writings. Clustering analyses may be performed on the inter-key interval data to determine an optimal number of bursts for the writings. An optimal burst boundary may be determined from the optimal number of bursts. Other burst-related measures and statistics, including the average and maximum burst lengths, may be determined from the writings based on the optimal burst boundary threshold. A score may be received for each of the writings. A validation indication metric may be generated for each of the writings based on the received score and the optimal burst boundary threshold. The resulting measures and statistics may be used or applied in different ways and provide personalized feedback as learning analytics.

20 Claims, 9 Drawing Sheets

(56) References Cited

OTHER PUBLICATIONS

Bennett, Randy Elliot; Cognitively Based Assessment of, for, and as Learning (CBAL): A Preliminary Theory of Action for Summative and Formative Assessment; Measurement, 8; pp. 70-91; 2010.
Bennett, Randy, Deane, Paul, van Rijn, Peter; From Cognitive-Domain Theory to Assessment Practice Educational Psychologist, 51(1); pp. 82-107; Mar. 2016.
Berninger, Virginia; Coordinating Transcription and Text Generation in Working Memory During Composing Automatic and Constructive Processes; Learning Disability Quarterly, 22(2); pp. 99-112; May 1999.
Bruckner, Sebastian, Pellegrino, James; Contributions of Response Processes Analysis to the Validation of an Assessment of Higher Education Students' Competence in Business and Economics; Ch. 3 in Understanding and Investigating Response Processes in Validation Research; Springer; pp. 31-52; May 2017.
Calinski, Tadeusz, Harabasz, J.; A Dendrite Method for Cluster Analysis; Communications in Statistics, 3(1); pp. 1-27; 1974.
Deane, Paul, Zhang, Mo; Exploring the Feasibility of Using Writing Process Features to Assess Text Production Skills; Educational Testing Service, Research Report RR-15-26; Dec. 2015.
Ercikan, Kadriye, Pellegrino, James; Validation of Score Meaning for the Next Generation of Assessments: The Use of Response Processes; Routledge; 2017.
Hayes, John; Modeling and Remodeling Writing; Written Communication, 29(3); pp. 369-388; Jul. 2012.
Lee, Yi-Hsuan, Haberman, Shelby; Investigating Test-Taking Behaviors Using Timing and Process Data International Journal of Testing, 16(3); pp. 240-267; 2016.
Leijten, Marielle, Macken, Lieve, Hoste, Veronique, Van Horenbeeck, Eric, Van Waes, Luuk; From Character to Word Level: Enabling the Linguistic Analyses of Inputlog Process Data; Proceedings of the EACL 2012 Workshop on Computational Linguistics and Writing; pp. 1-8; Apr. 2012.
Leijten, Marielle, Van Waes, Luuk; Keystroke Logging in Writing Research: Using Inputlog to Analyze and Visualize Writing Processes; Written Communication, 30(3); pp. 358-392; Jul. 2013.
Liu, Ou Lydia, Bridgeman, Brent, Gu, Lixiong, Xu, Jun, Kong, Nan; Investigation of Response Changes in the GRE Revised General Test; Educational and Psychological Measurement, 75(6); pp. 1002-1020; 2015.
Liu, Yanchi, Li, Zhongmou, Xiong, Hui, Gao, Xuedong, Wu, Junjie; Understanding of Internal Clustering Validation Measures; Proceedings of the IEEE International Conference on Data Mining; pp. 911-916; 2010.
McCutchen, Deborah; Knowledge, Processing, and Working Memory: Implications for a Theory of Writing Educational Psychologist, 35(1); pp. 13-23; 2000.
Stevenson, Marie, Schoonen, Rob, de Glopper, Kees; Revising in Two Languages: A Multi-Dimensional Comparison of Online Writing Revisions in L1 and FL; Journal of Second Language Writing, 15(3); pp. 201-233; Dec. 2006.
Von Koss Torkildsen, Janne, Morken, Froydis, Helland, Wenche, Helland, Turid; The Dynamics of Narrative Writing in Primary Grade Children: Writing Process Factors Predict Story Quality; Reading and Writing: An Interdisciplinary Journal, 29; pp. 529-554; 2016.
Van Rijn, Peter, Chen, Jing, Yan-Koo, Yuen; Statistical Results From the 2013 CBAL English Language Arts Multistate Study: Parallel Forms for Policy Recommendation Writing; ETS Research Memorandum, RM-16-01; Feb. 2016.
Zhang, Mo, Deane, Paul; Process Features in Writing: Internal Structure and Incremental Value Over Product Features; Educational Testing Service, Research Report RR-15-27; Dec. 2015.
Zhu, Mengxiao, Feng, Gary; An Exploratory Study Using Social Network Analysis to Model Eye Movements in Mathematics Problem Solving; Proceedings of the 5th International LAK Conference; Mar. 2015.
Zhu, Mengxiao, Shu, Zhan, von Davier, Alina; Using Networks to Visualize and Analyze Process Data for Educational Assessment; Journal of Educational Measurement, 53(2); pp. 190-211; Summer 2016.
Zhu, Mengxiao, Zhang, Mo; Examining the Patterns of Communication and Connections Among Engineering Professional Skills in Group Discussion: A Network Analysis Approach; IEEE Integrated STEM Education Conference; Mar. 2016.

* cited by examiner

DEFINING PERSONALIZED WRITING BURST MEASURES OF TRANSLATION USING KEYSTROKE LOGS

CROSS-REFERENCE TO RELATED APPLICATIONS

This application claims priority to U.S. Provisional Application No. 62/641,704, filed Mar. 12, 2018, the entirety of which is incorporated by reference herein.

TECHNICAL FIELD

The technology described herein relates to systems and methods of collecting and applying writing process data, and particularly keystroke log data, to provide information about a writer's proficiency and performance.

BACKGROUND

When writing tasks are delivered on a computer, the process(es) by which a writer produces his or her essay response may be captured through keystroke logging. For educational and/or assessment purposes, meaningful information can be extracted from these keystroke logs regarding a writer's proficiency and performance.

A keystroke logging system (e.g., Educational Testing Service's ("ETS") keystroke logging system) may record changes to a text buffer while a user is writing, along with associated timestamps. For example, information tracked by ETS's keystroke logging system includes: the type of action (e.g., pause, insert, delete, paste, cut, replace); the length of action (e.g., number of characters/words, time duration); the location of action (e.g., inside of a word, between words, between sentences); and the time-point of action (e.g., after jumping to a different place in the text, at the start of a writing session, before final submission). Additional information that may be tracked includes cursor movements, access to resources outside of a "response box," such as mouse clicks and time spent on external references, and a use of editing tools supplied by a task-delivery interface. A gap-time between keystrokes (or "pause") may also be collected.

SUMMARY

Systems and methods are provided for defining and using an optimal burst boundary threshold to assess the reliability of a manual or automatic writing score. For example, in an exemplary method, keystroke data, including inter-key interval data, may be gathered from one or more writings. One or more clustering analyses may be performed on the inter-key interval data to determine an optimal number of bursts for the one or more writings. An optimal burst boundary may be determined from the optimal number of bursts. Other burst-related measures and statistics, including the average and maximum burst lengths, may be determined from the one or more writings based on the optimal burst boundary threshold. Inter-burst intervals of extreme length may be eliminated from consideration. A score may be received for the one or more writings. A validation indication metric may be generated for each of the one or more writings based on the received score and the optimal burst boundary threshold.

As another example, a system for defining and using an optimal burst boundary threshold to assess the reliability of a manual or automatic writing score, may be provided. The system may comprise one or more data processors and a non-transitory computer-readable medium encoded with instructions for commanding the one or more data processors to execute steps of a process. The process may comprise: gathering keystroke log data from one or more writings, wherein the keystroke log data comprises inter-key interval data from all or a portion of the one or more writings; performing one or more clustering analyses on the inter-key interval data to determine an optimal number of bursts for the one or more writings; determining an optimal burst boundary threshold from the optimal number of bursts; receiving a score for each of the one or more writings; and validating the score for each of the one or more writings based on the received score and the optimal burst boundary threshold and scoring a validation indication metric for each of the one or more writings. The process may also comprise: determining other burst-related measures and statistics from the one or more writings based on the optimal burst boundary threshold; and/or eliminating inter-burst intervals of extreme length.

As yet another example, a non-transitory computer-readable medium may be provided. The non-transitory computer-readable medium may be encoded with instructions for commanding one or more data processors to execute a method of defining and using an optimal burst boundary threshold to assess the reliability of a manual or automatic writing score. The method may comprise: gathering keystroke log data from one or more writings, wherein the keystroke log data comprises inter-key interval data from all or a portion of the one or more writings; performing one or more clustering analyses on the inter-key interval data to determine an optimal number of bursts for the one or more writings; determining an optimal burst boundary threshold from the optimal number of bursts; receiving a score for each of the one or more writings; and validating the score for each of the one or more writings based on the received score and the optimal burst boundary threshold and scoring a validation indication metric for each of the one or more writings. The method may also comprise: determining other burst-related measures and statistics from the one or more writings based on the optimal burst boundary threshold; and/or eliminating inter-burst intervals of extreme length.

DETAILED DESCRIPTION

Systems and methods as described herein provide an improved approach of collecting, analyzing and applying response process data, and particularly keystroke log data, to provide information about a writer's proficiency and performance, including an improved approach of defining burst boundary thresholds, from which one can meaningfully break the translation process into an optimal number of bursts.

Figure 1:
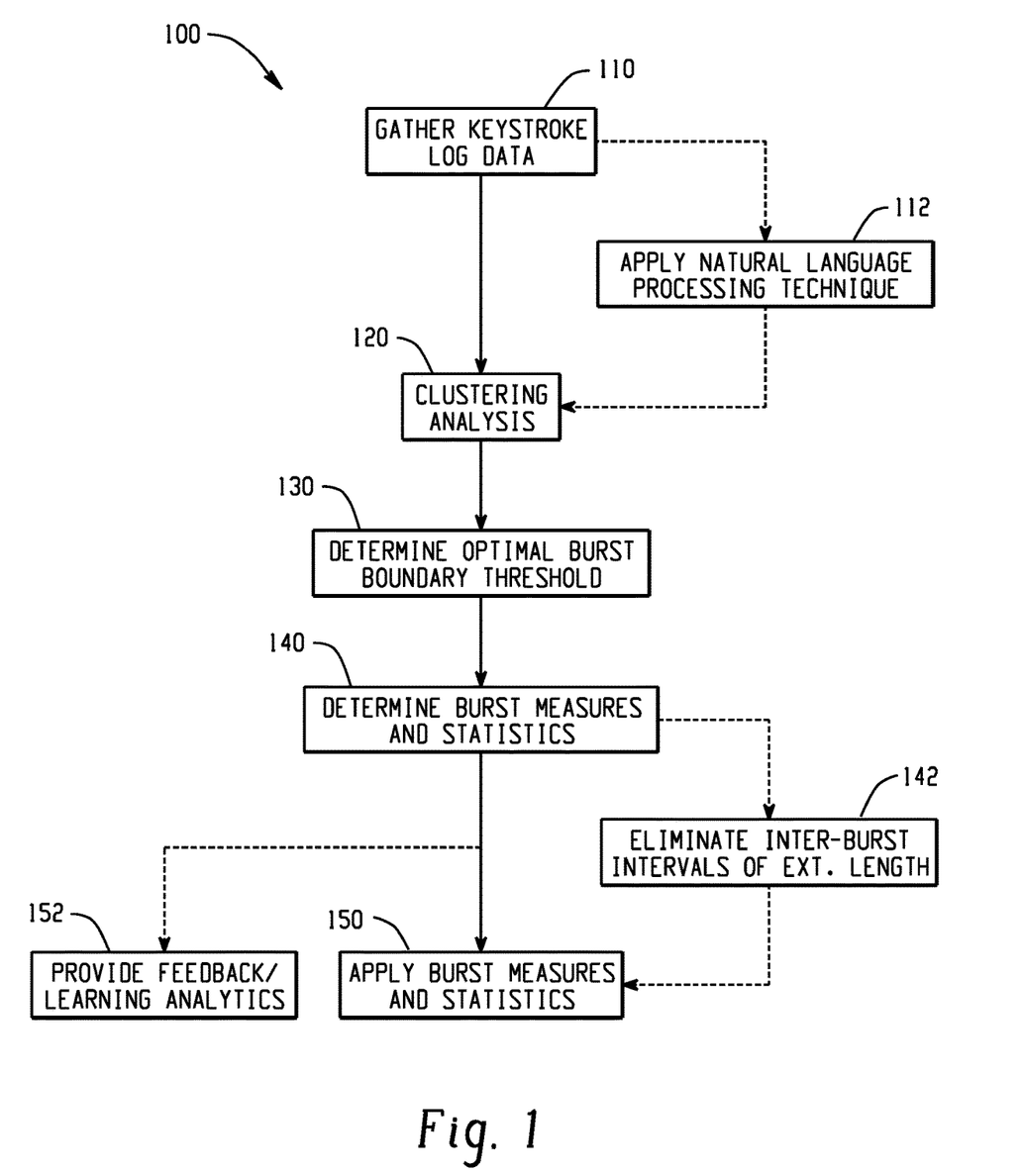
FIG. 1 is a diagram depicting a method of collecting, analyzing and applying writing burst measures and statistics.

As shown in FIG. 1, an exemplary method 100 comprises gathering keystroke log data from one or more writings (Step 110). These writings may be, for example, written in response to one or more questions or prompts (e.g., an essay answer).

A Natural Language Processing technique may be applied to enhance keystroke log data (Step 112) by, for example, identifying word, phrase, sentence and paragraph units, spelling errors and spelling corrections, classifying words and phrases into different types (e.g., noun, verb, adjective), and analyzing keystroke behaviors based on linguistic features of the text produced (e.g., for common vs. rare phrases).

The resulting collection of keystroke actions, pause patterns, and linguistic properties may be analyzed to make inferences about a writer's cognitive process during text production. For example, stronger writers may tend to more efficiently manage their writing, produce text fluently in relatively long chunks or "bursts," pause mostly at natural junctures (e.g., clause and sentence boundaries), and engage in more editing and revision. By contrast, weaker writers may tend to produce text less efficiently and pause more frequently in locations that suggest difficulties in typing, spelling, word-finding and other transcription processes.

Among the various feature variables that have been used to characterize the writing process, bursts have been identified as providing important information about the fluency and proficiency of individual writing processes. Bursts are defined as a sequence of text production without major interruptions, where a major interruption is signaled by a relatively long pause. Various burst measures, including burst size, burst frequency and maximum burst length, may be indicative of a writer's text production fluency.

There are many ways to define a burst in practice, depending on the location where bursts are allowed to end (i.e., between characters or between words), and on the length of a pause that is considered long enough to count as a "burst boundary."

One difficulty in using existing burst measures to make inferences about writing fluency is that the properties of bursts can be affected by more than one cognitive process, including both the ability to translate ideas into language ("translation") and the ability to put words on paper ("transcription"); the latter of which can be approximated by typing speed. For example, among other current methods, a predefined pause length may be used for all inter-key intervals (e.g., a ⅔ second pause) and/or all inter-word intervals (e.g., a 2 second pause) to indicate a burst boundary. This approach applies a single, fixed threshold for every text produced by every writer. It is simple and straightforward; yet one disadvantage of this approach may be that the resulting burst measures do not control for keyboarding skill. For example, a slow typist may seem dysfluent without actually having weaker abilities to generate ideas or to put them into words.

Thus, it may be advantageous to measure writing fluency, separate from typing speed, to reflect the speed with which a writer can generate ideas and put them into words. In particular, it may be advantageous to use a measure that shows better separation between the translation and transcription subprocesses, manifested in a lower correlation with typing speed.

Another difficulty in using existing burst measures is that burst boundary thresholds may change as a writing composition proceeds. For example, burst boundary thresholds may be calculated "on-the-fly" (i.e., while a writing is being produced) for inter-word intervals using all inter-word interval information collected so far, where the thresholds may be defined as being a predetermined factor (e.g., four) times the median across previous inter-word intervals. Due to its time-adaptive nature, this method may not fully consider the pause patterns throughout the writing process since it only uses partial information to produce burst boundary thresholds. Further, this method may be sensitive to a writer's composition strategy and may generate burst measures that are only weakly related to the quality of an individual's writing.

Thus, it may also be advantageous to define burst boundaries that are individualized and account for a writer's unique linguistic process(es).

Figure 2:
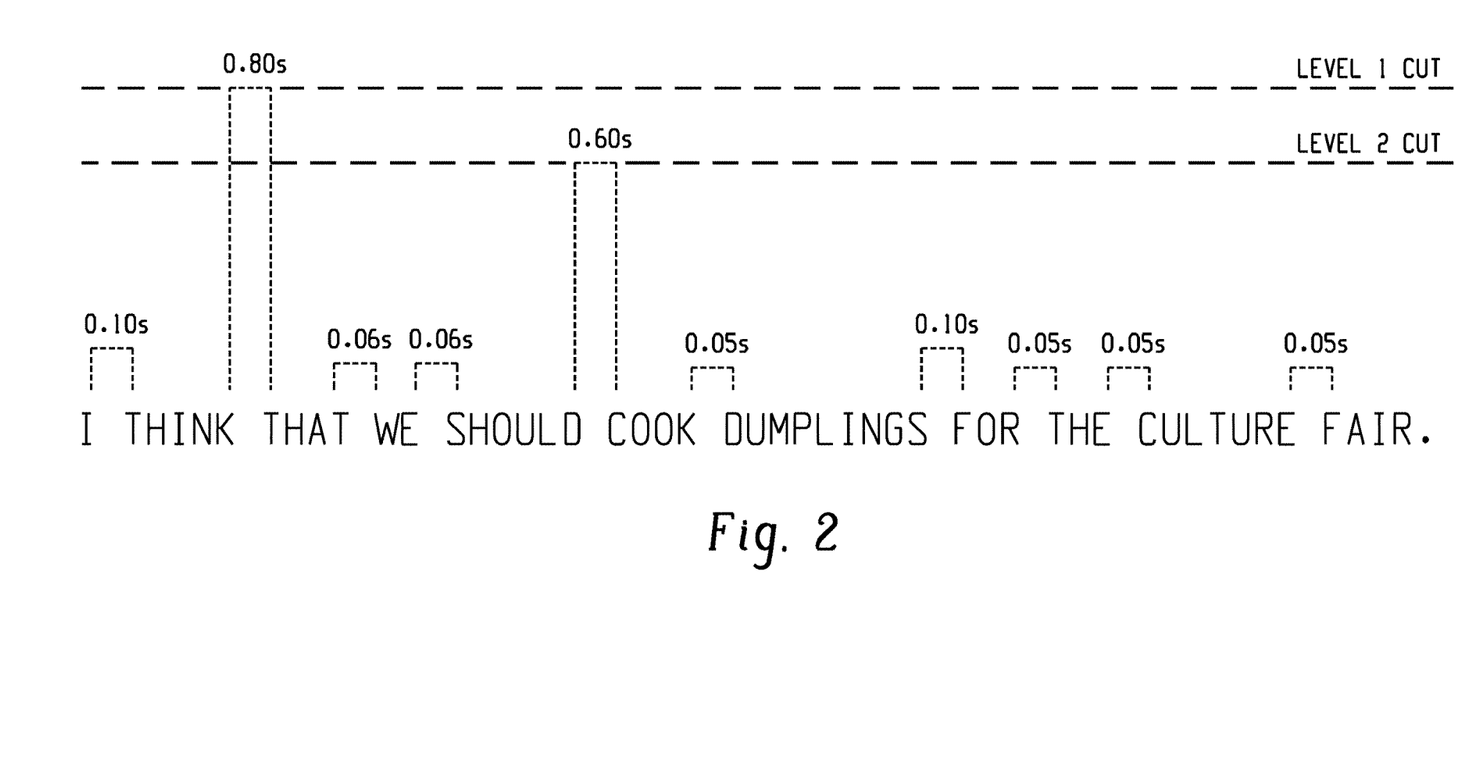
FIG. 2 is a diagram depicting the effects of burst boundary thresholds on the translation process.

The keystroke log data (collected at Step 110) may include inter-key interval data (i.e., pause lengths (or time intervals) between consecutive keystrokes) such as inter-word interval data (i.e., pause lengths (or time intervals) between consecutive words), for all or a portion of each writing. For example, as shown in FIG. 2, inter-key interval data, particularly inter-word interval data, may be gathered for the sentence: "I think that we should cook dumplings for the Culture fair." The longest inter-word interval is 0.80 seconds (s), lying between the words "think" and "that." The second longest inter-word interval is 0.60 s, lying between the words "should" and "cook," and so on. If the burst boundary threshold is set at 0.80 s (i.e., equal to the longest inter-word interval ("Level 1")), the writing process will be broken into two bursts: "I think" would be the first burst, and the remainder of the sentence would be the second. If the burst boundary threshold is set at 0.60 s (i.e., equal to the second longest inter-word interval ("Level 2")), the writing process would be broken into three bursts. Lowering the burst boundary threshold even further would break the writing process into even more bursts. For example, using a burst boundary threshold of 0.05 s would break this single, short sentence into ten one-word bursts.

To determine an optimal number of bursts (or "clusters"), one or more clustering analyses may be performed on the inter-key interval data and/or inter-word interval data gathered with the keystroke log data (Step 120). For example, an appropriate clustering criterion measure (e.g., agglomerative hierarchical clustering, the Calinski-Harabasz ("CH") index, k-nearest neighbor chain, k-means clustering, Ward's minimum-variance method) may be used. Equation 1 (below) shows an equation for the CH index, where n is the number of elements and k is the number of clusters. The B(k) and W(k) are the between-cluster variance and within-cluster variance corresponding to k clusters, respectively. The optimal number of clusters (or bursts) corresponds to the threshold value that leads to the maximum CH index (e.g., maximizing the between-cluster variance while minimizing the within-cluster variance).

$$CH(k) = \frac{B(k)}{W(k)} \frac{n-k}{k-1}. \quad (1)$$

Having determined the optimal number of bursts, an optimal burst boundary threshold (i.e., the burst boundary threshold that breaks the translation into the optimal number of bursts) may be determined (Step 130). For example, as shown in FIG. 2, if the optimal number of bursts is determined to be three, the optimal burst boundary threshold would be 0.60 s (Level 2).

Other burst-related measures may then be determined using the optimal burst boundary threshold, such as burst lengths and inter-burst intervals (i.e., pause length (or time interval) between bursts), and statistics calculated based on each (Step 140). For example, among other measures and statistics, the average and maximum burst lengths may be of particular interest as more fluent writers may produce longer bursts, and less fluent writers may produce shorter bursts.

As shown in FIG. 1, inter-burst intervals of extreme (i.e., overly long and/or short) length (e.g., pauses longer and/or shorter than an appropriate number of standard deviations from the average inter-burst interval) may be optionally eliminated from consideration, as those pauses may indicate planning, not translation (Step 142).

The measures and statistics may be used or applied in any number of ways (Step 150), including as an individualized measure of a writer's ability to translate ideas into verbal form (i.e., verbal ability) and/or of whether a writer is having trouble in one or more aspects of their writing process. The measures and statistics may also provide feedback in learning analytics. Additionally, because a stronger correlation with essay (or test) scores and a reduced association with keyboarding skills may be achieved, the measures and statistics may be used improve the reliability of those scores. The resulting measures and statistics may also be used or applied in different ways and provide personalized feedback as learning analytics (Step 152).

Figure 3:
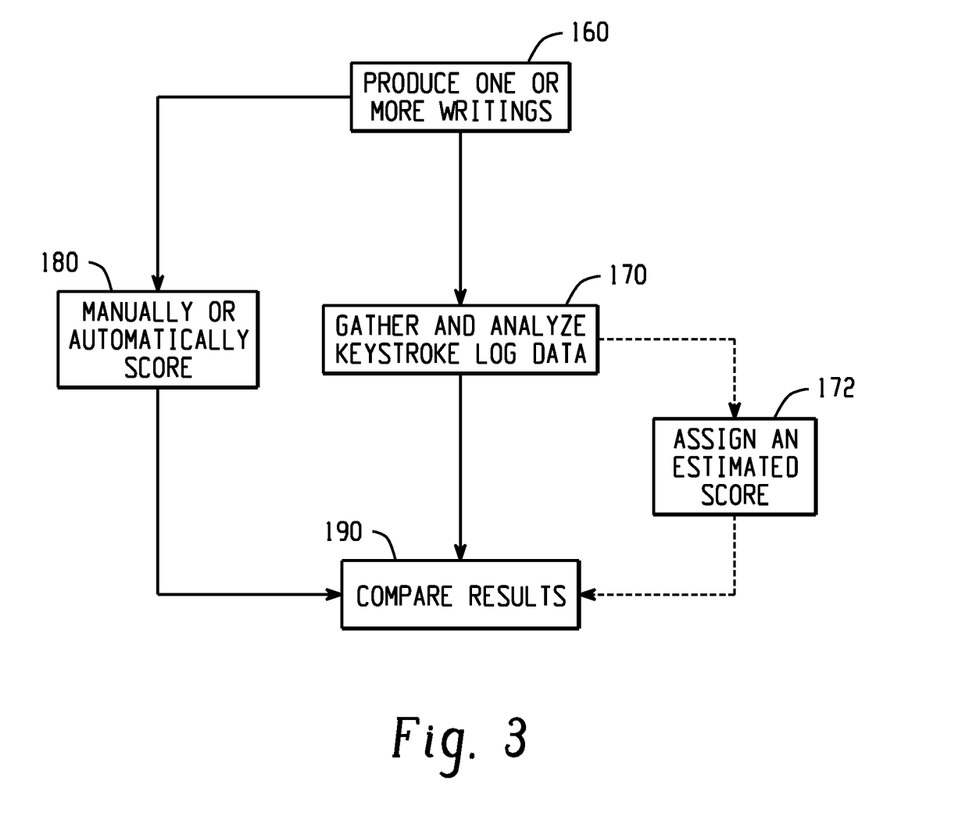
FIG. 3 depicts a process for validating essay scores using keystroke log data.

For example, as shown in FIG. 3, one or more writings (e.g., an essay) may be produced in response to a question or prompt (Step 160). Keystroke log data may be collected from the one or more writings and analyzed as described above to determine an optimal burst boundary threshold and, optionally, other burst-related measures and statistics (e.g., average and maximum burst lengths) (Step 170). Using a predetermined or established correlation between burst boundary thresholds or the other measures and statistics and writing scores or other measures of writing performance, the one or more writings may be optionally assigned an estimated score (Step 172). The one or more writings may be simultaneously scored manually (i.e., by a human test scorer) or with the aid of one or more appropriate test scoring systems (Step 180). For example, the one or more writings may be manually or automatically scored according to a scoring rubric or metrics extracted from those writings as described in more detail below. This score may then be compared to the optimal burst boundary threshold, other measures and statistics, and/or estimated score, to check the reliability of the manual or automatic score (Step 190).

Figure 4:
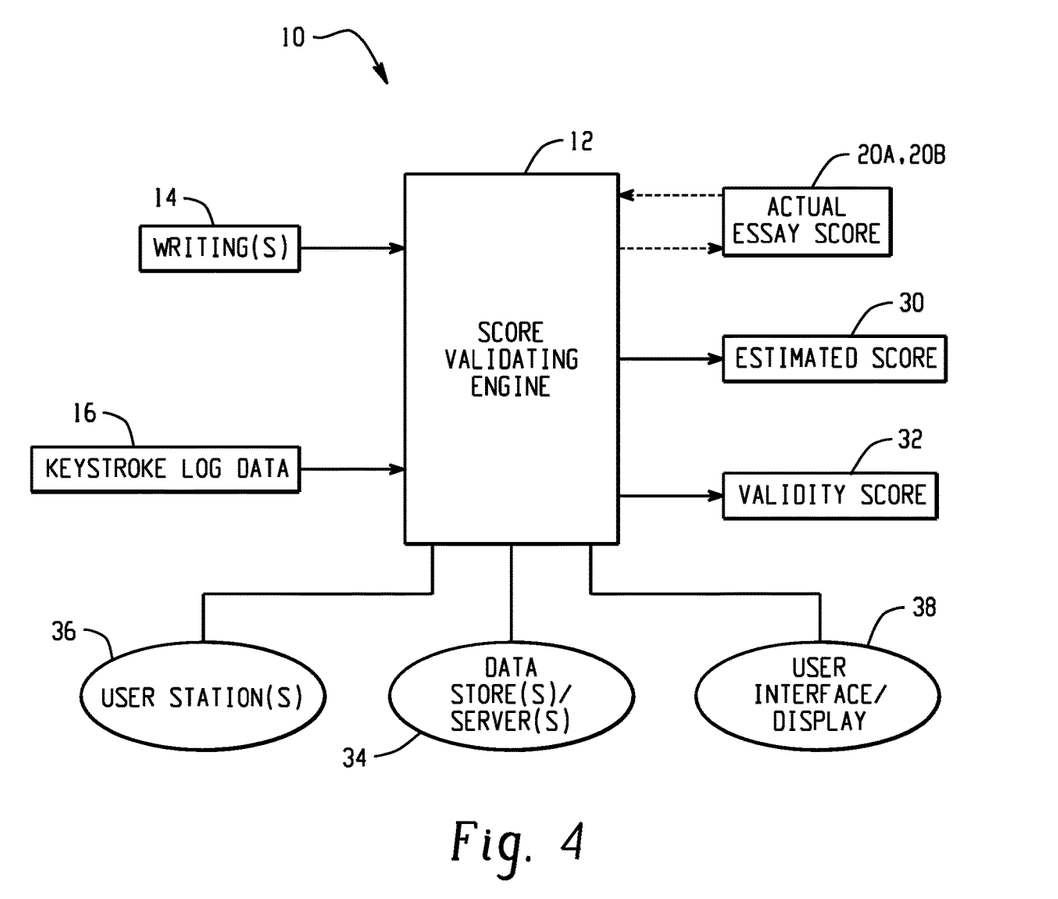
FIG. 4 depicts a computer-implemented score validating engine.
Figure 5:
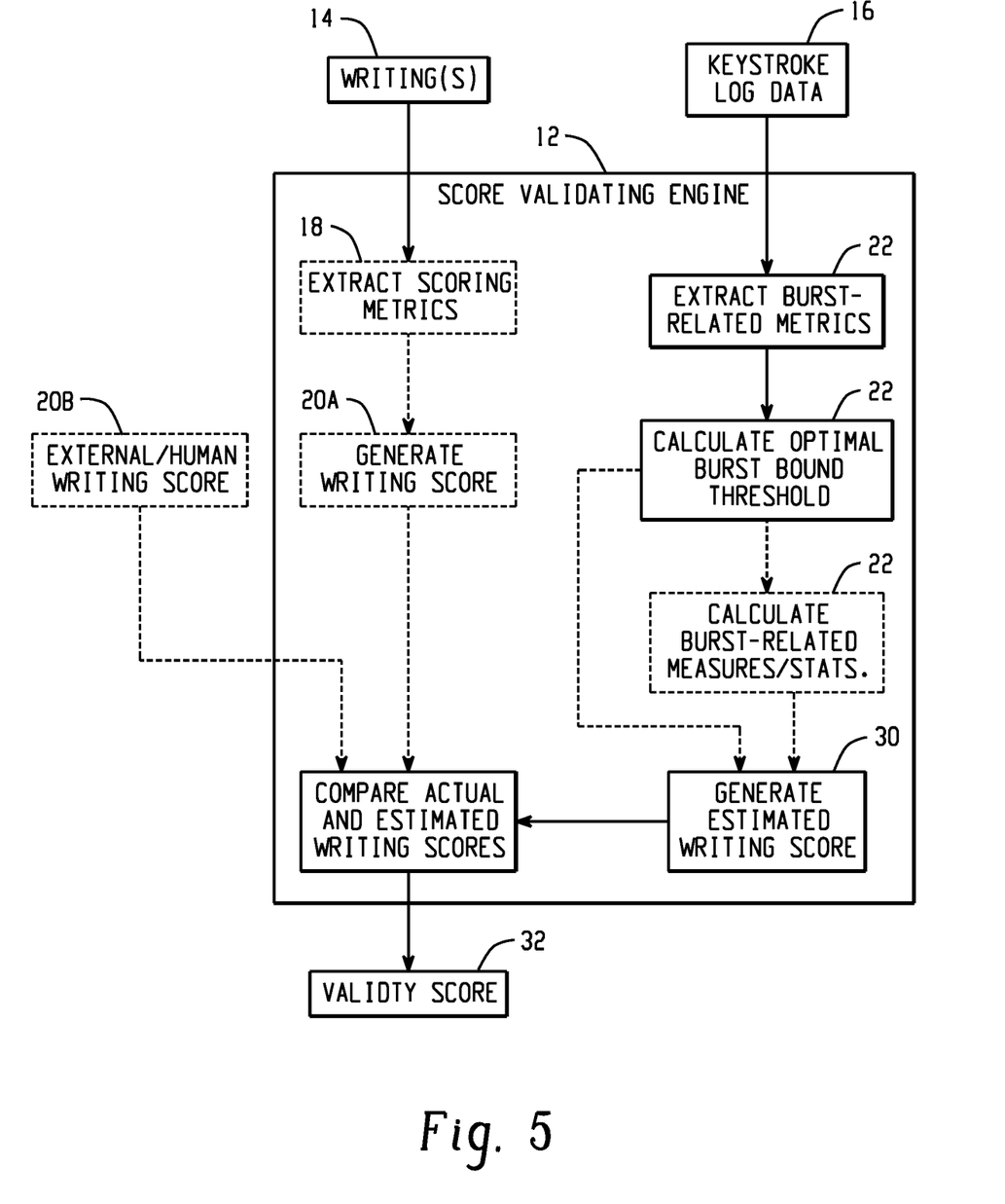
FIG. 5 depicts example processes performed by a score validating engine.

As an exemplary automated scoring system, FIGS. 4 and 5 are block diagrams depicting a computer-implemented system 10 for processing one or more writings 14 to provide a validity score 32, among other outputs.

The system 10 includes a score validating engine 12. As inputs, the score validating engine 12 may receive one or more writings 14 (e.g., an essay) and corresponding keystroke log data 16 for each writing 14. The system 10 may include one or more user stations 36 (e.g., a personal computer) connected to the engine 12, such that the writing 14 and/or keystroke log data 16 may be gathered directly by the engine 12. That is, the writing 14 and keystroke log data 16 may be transmitted to the engine 12 during or after a writer produces the writing 14 at the user station 36. Additionally or alternatively, the writing 14 and/or keystroke log data 16 may be gathered by an external system and fed into the engine 12.

The score validating engine 12 may be programmed to extract one or more scoring metrics 18 from the writing 14 and to generate a writing score 20A, based on the extracted scoring metrics 18. For example, among other scoring metrics, the engine 12 may extract subjectivity metrics, stative verb metrics, narrative quality metrics and/or holistic metrics. Additionally or alternatively, the writing 14 may be scored by an external system and/or human test scorer and a writing score 20B may be fed into the engine 12. The writing score 20A and external/human writing score 20B represent actual writing scores.

The engine 12 may also be programmed to extract burst-related metrics 22 (e.g., inter-word intervals) and calculate the optimal burst boundary threshold 24 and, optionally, other burst-related measures and statistics 26 (e.g., the average and maximum burst lengths) as discussed above. Using a predetermined correlation table, the engine 12 may generate an estimated writing score 30 based on the optimal burst boundary threshold 24 and/or the other measures and statistics 26.

The engine 12 may compare the actual writing score 20A, 20B and the estimated writing score 30 to generate a validity score 32. The validity score 32 may reflect the likelihood that the actual writing score 20A, 20B is correct based on a predetermined correlation table or other statistics. In this way, the engine 12 provides users with an automatic validity check against automated and/or manual scoring of the writing 14 (i.e., actual writing score 20A, 20B). For example, if the validity score 32 is low, this may indicate that the actual writing score 20A, 20B is probably incorrect; alternatively, if the validity score 32 is high, this may indicate that the actual writing score 20A, 20B is probably correct.

As shown in FIG. 4, the score validating engine 12 may be connected to one or more data stores or servers 34 that contain data (e.g., one or more correlation tables and/or statistics) or programs to assist in automatically extracting metrics from the one or more writings and calculating the intermediate and ultimate outputs of the engine 12. Additionally, the engine may be connected to one or more user interfaces or displays 38 for presenting the outputs of engine 12 (e.g., essay score 20A, burst-related metrics 22, optimal burst boundary threshold 24, other measures and statistics 26, estimated writing score 30, validity score 32) to the user.

It should be appreciated that although the keystroke log data is preferably analyzed and applied as described above after a writing is complete, it may be analyzed and applied at any appropriate time including throughout the writing process at random or predetermined intervals (e.g., after a predetermined amount of time has passed or after a predetermined number of words have been written). In this way, the measures and statistics described above may be analyzed and applied in real-time, allowing teachers or administrators and/or writers to address issues or potential issues in real-time.

Figure 6A:
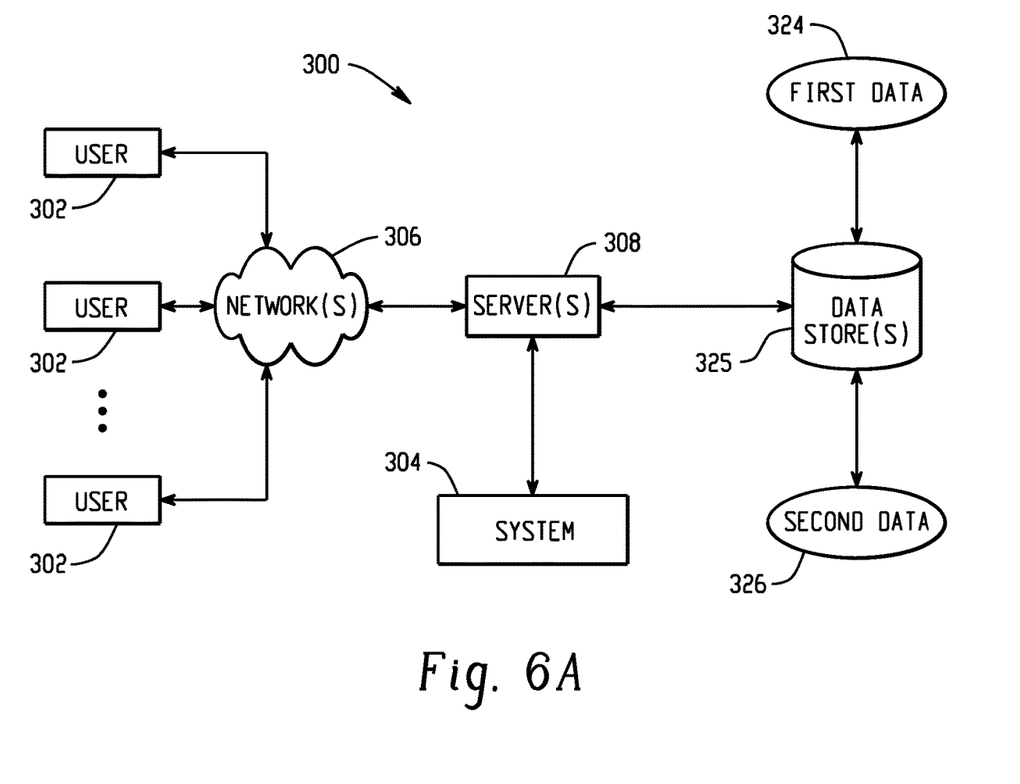
FIGS. 6A, 6B, 6C and 6D depict exemplary systems for implementing various aspects described herein.

FIG. 6A depicts a computer-implemented environment 300 wherein users 302 can interact with a system 304, operable to execute method 100, hosted on one or more servers 308 through one or more networks 306. The system 304 contains software operations or routines. The users 302 can interact with the system 304 in a number of ways, such as over the one or more networks 306. The one or more servers 308 accessible through the network(s) 306 can host system 304. It should be understood that the system 304 could also be provided on a stand-alone computer for access by a user.

Figure 6B:
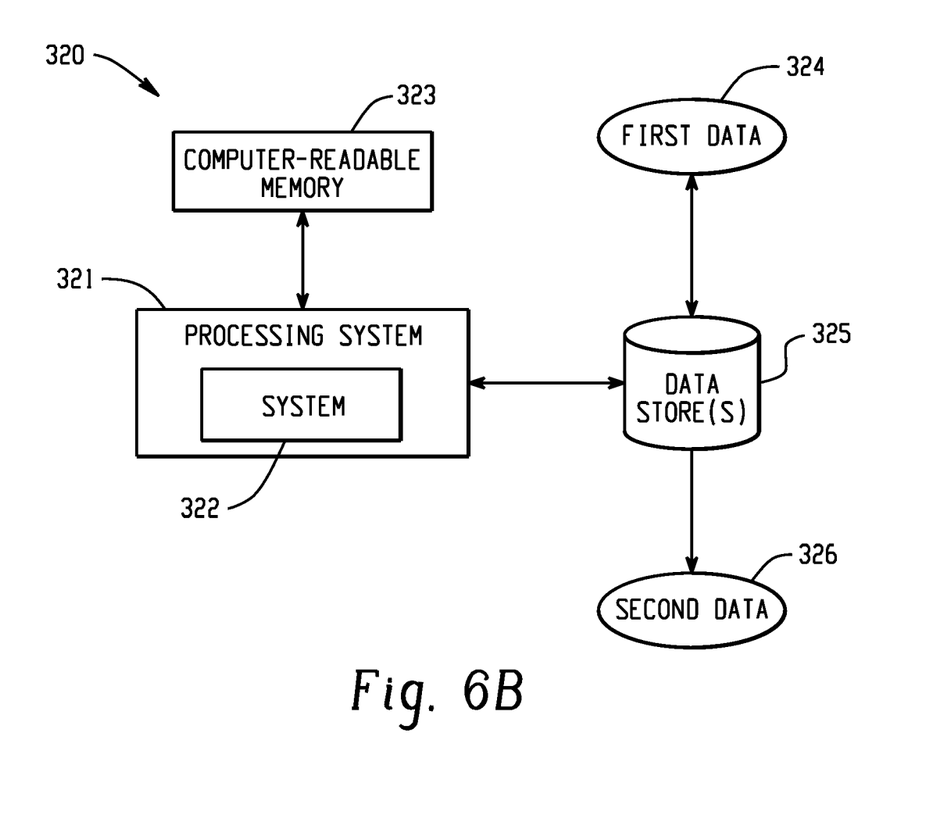
Figure 6C:
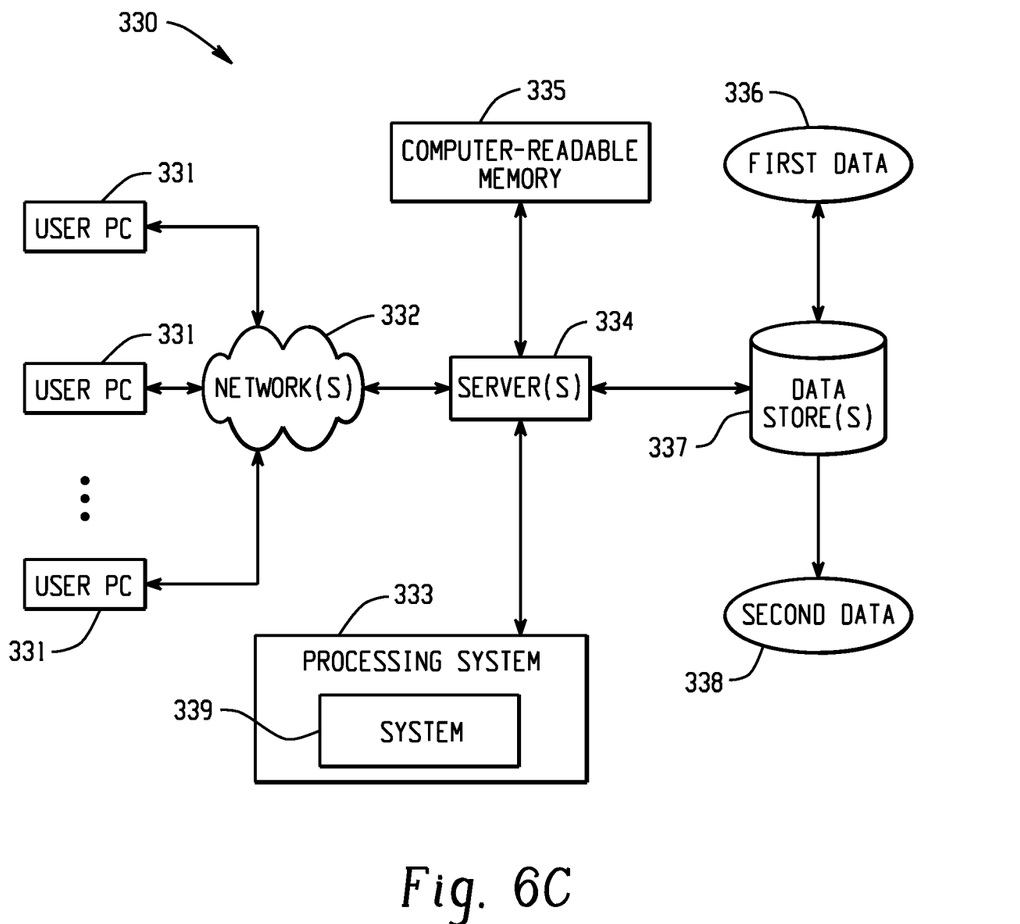
Figure 6D:
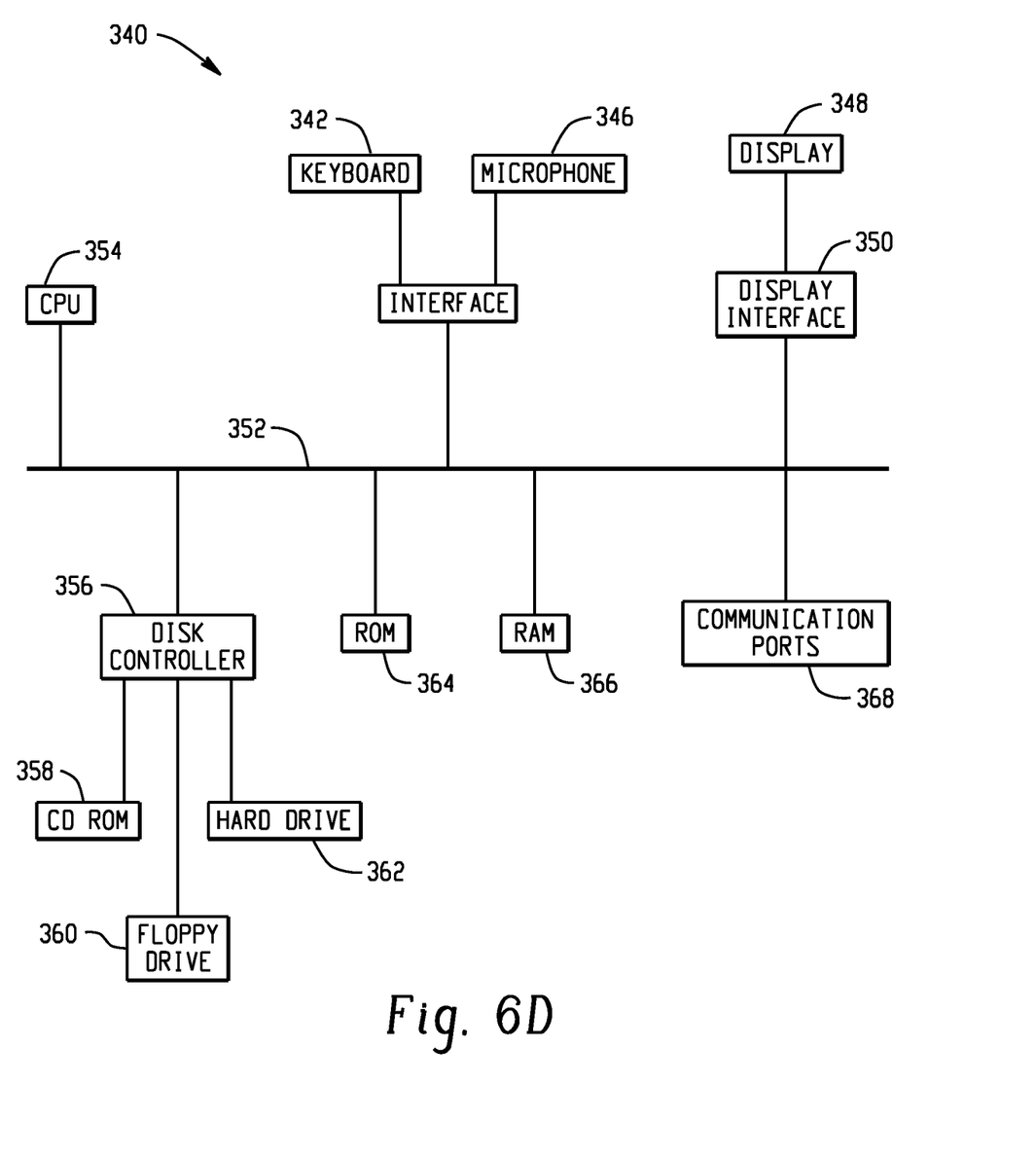

FIGS. 6B, 6C and 6D depict example systems, operable to execute method 100, for use in implementing a system. For example, FIG. 6B depicts an exemplary system 320 that includes a standalone computer architecture where a processing system 321, e.g., one or more computer processors, includes a system 322 being executed on it. The processing system 321 has access to a non-transitory computer-readable memory 323 in addition to one or more data stores 325. The one or more data stores 325 may contain first data 324 as well as second data 326.

FIG. 6C depicts a system 330 that includes a client server architecture. One or more user PCs 331 accesses one or more servers 334 running a system 339 on a processing system 333 via one or more networks 332. The one or more servers 334 may access a non-transitory computer readable memory 335 as well as one or more data stores 337. The one or more data stores 337 may contain first data 336 as well as second data 338.

FIG. 6D shows a block diagram of exemplary hardware for a standalone computer architecture 340, such as the architecture depicted in FIG. 6B, that may be used to contain and/or implement the program instructions of system embodiments of the present disclosure. A bus 352 may serve as the information highway interconnecting the other illustrated components of the hardware. A processing system 354 labeled CPU (central processing unit), e.g., one or more computer processors, may perform calculations and logic operations required to execute a program. A non-transitory computer-readable storage medium, such as read only memory (ROM) 364 and random access memory (RAM) 366, may be in communication with the processing system 354 and may contain one or more programming instructions. Optionally, program instructions may be stored on a non-transitory computer-readable storage medium such as a magnetic disk, optical disk, recordable memory device, flash memory or other physical storage medium. Computer instructions may also be communicated via a communications signal or a modulated carrier wave, e.g., such that the instructions may then be stored on a non-transitory computer-readable storage medium.

A disk controller 356 interfaces one or more optional disk drives to the system bus 352. These disk drives may be external or internal floppy disk drives 360, external or internal CD-ROM, CD-R, CD-RW or DVD drives 358, or external or internal hard drives 362. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 356, the ROM 364 and/or the RAM 366. Preferably, the processor 354 may access each component as required.

A display interface 350 may permit information from the bus 352 to be displayed on a display 348 in audio, graphic or alphanumeric format. Communication with external devices may optionally occur using various communication ports 368.

In addition to the standard computer-type components, the hardware may also include data input devices, such as a keyboard 342 or other input device such as a microphone, camera, etc. 346.

This written description describes exemplary embodiments of the present disclosure, but other variations fall within the scope of the disclosure. For example, the systems and methods may include and utilize data signals conveyed via networks, e.g., local area network, wide area network, internet, combinations thereof, etc., fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code or any other stored data that is operable to cause a processing system to perform the methods and operations described herein. Any suitable computer languages may be used such as C, C++, Java, Python, etc., as will be appreciated by those skilled in the art. Other implementations may also be used, however, such as firmware or even appropriately designed hardware configured to carry out the methods and systems described herein.

The systems' and methods' data, e.g., associations, mappings, data input, data output, intermediate data results, final data results, etc., may be stored and implemented in one or more different types of computer-implemented data stores, such as different types of storage devices and programming constructs, e.g., RAM, ROM, Flash memory, flat files, databases, programming data structures, programming variables, IF-THEN (or similar type) statement constructs, etc. It is noted that data structures describe formats for use in organizing and storing data in databases, programs, memory or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A method of automatically assessing writing proficiency and performance by defining and using an optimal burst boundary threshold to assess the reliability of a manual or automatic writing score, the method being implemented by one or more computing devices and comprising:

gathering keystroke log data from one or more writings, wherein the keystroke log data comprises inter-key interval data from all or a portion of the one or more writings, the keystroke log data being generated by a keystroke system that records changes to a text buffer while a user is generating the one or more writings in a graphical user interface using one or more input devices along with associated time stamps;

performing one or more clustering analyses on the inter-key interval data to determine an optimal number of bursts for the one or more writings;

determining an optimal burst boundary threshold from the optimal number of bursts;

estimating a score for the one or more writings based on the determined optimal burst boundary threshold and a correlation between burst boundary thresholds and writing scores or other measures of writing performance;

receiving a score for each of the one or more writings which assess writing proficiency and performance;

validating the score for each of the one or more writings by providing a corresponding validation score based on a comparison of the received score and estimated score for each of the one or more writings;

providing, for each writing, the received score when the corresponding validation score is above a level.

2. The method of claim 1, wherein a burst is a sequence of text production without a pause exceeding the optimal burst boundary threshold.

3. The method of claim 1, wherein the one or more clustering analyses comprises at least one of agglomerative hierarchical clustering, the Calinski-Harabasz index, k-nearest neighbor chain, k-means clustering and Ward's minimum-variance method.

4. The method of claim 1, wherein the one or more clustering analyses comprises the Calinski-Harabasz index.

5. The method of claim 1, further comprising determining other burst-related measures and statistics from the one or more writings based on the optimal burst boundary threshold.

6. The method of claim 5, wherein the other burst-related measures and statistics comprises at least one of an average burst length and a maximum burst length.

7. The method of claim 4, further comprising eliminating inter-burst intervals of extreme length.

8. The method of claim 1, wherein inter-key interval data comprises inter-word interval data.

9. A system for automatically assessing writing proficiency and performance by defining and using an optimal burst boundary threshold to assess the reliability of a manual or automatic writing score, the system comprising:
one or more data processors; and
a non-transitory computer-readable medium encoded with instructions for commanding the one or more data processors to execute steps of a process, the process comprising:
gathering keystroke log data from one or more writings, wherein the keystroke log data comprises inter-key interval data from all or a portion of the one or more writings, the keystroke log data being generated by a keystroke system that records changes to a text buffer while a user is generating the one or more writings in a graphical user interface using one or more input devices along with associated time stamps;

performing one or more clustering analyses on the inter-key interval data to determine an optimal number of bursts for the one or more writings;

determining an optimal burst boundary threshold from the optimal number of bursts;

estimating a score for the one or more writings based on the determined optimal burst boundary threshold and a correlation between burst boundary thresholds and writing scores or other measures of writing performance;

receiving a score for each of the one or more writings which assess writing proficiency and performance;

validating the score for each of the one or more writings by providing a corresponding validation score based on a comparison of the received score and estimated score for each of the one or more writings; and providing, for each writing, the received score when the corresponding validation score is above a level.

10. The system of claim 9, wherein the process further comprises determining other burst-related measures and statistics from the one or more writings based on the optimal burst boundary threshold.

11. The system of claim 9, wherein a burst is a sequence of text production without a pause exceeding the optimal burst boundary threshold.

12. The system of claim 9, wherein the one or more clustering analyses comprises at least one of agglomerative hierarchical clustering, the Calinski-Harabasz index, k-nearest neighbor chain, k-means clustering and Ward's minimum-variance method.

13. The system of claim 9, wherein the one or more clustering analyses comprises the Calinski-Harabasz index.

14. The system of claim 9, wherein the process further comprises: determining other burst-related measures and statistics from the one or more writings based on the optimal burst boundary threshold.

15. The system of claim 14, wherein the other burst-related measures and statistics comprises at least one of an average burst length and a maximum burst length.

16. The system of claim 15, wherein the process further comprises: eliminating inter-burst intervals of extreme length.

17. The system of claim 9, wherein inter-key interval data comprises inter-word interval data.

18. A non-transitory computer-readable medium encoded with instructions for commanding one or more data processors to execute a method of automatically assessing writing proficiency and performance by defining and using an optimal burst boundary threshold to assess the reliability of a manual or automatic writing score, the method comprising:
gathering keystroke log data from one or more writings, wherein the keystroke log data comprises inter-key interval data from all or a portion of the one or more writings, the keystroke log data being generated by a keystroke system that records changes to a text buffer while a user is generating the one or more writings in a graphical user interface using one or more input devices along with associated time stamps;

performing one or more clustering analyses on the inter-key interval data to determine an optimal number of bursts for the one or more writings;

determining an optimal burst boundary threshold from the optimal number of bursts;

estimating a score for the one or more writings based on the determined optimal burst boundary threshold and a correlation between burst boundary thresholds and writing scores or other measures of writing performance;

receiving a score for each of the one or more writings which assess writing proficiency and performance;

validating the score for each of the one or more writings by providing a corresponding validation score based on a comparison of the received score and estimated score for each of the one or more writings;

providing, for each writing, the received score when the corresponding validation score is above a level.

19. The non-transitory computer-readable medium of claim 18, wherein the one or more clustering analyses comprises the Calinski-Harabasz index.

20. The non-transitory computer-readable medium of claim 18, wherein a burst is a sequence of text production without a pause exceeding the optimal burst boundary threshold.

* * * * *